J. F. GAZLEY.
Harrows.
No. 139,309.  Patented May 27, 1873.
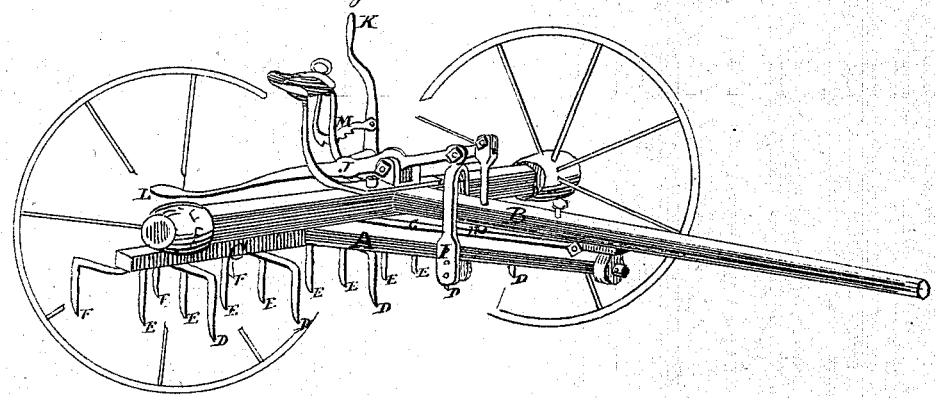
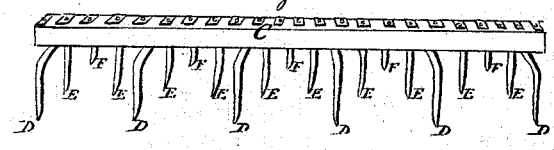
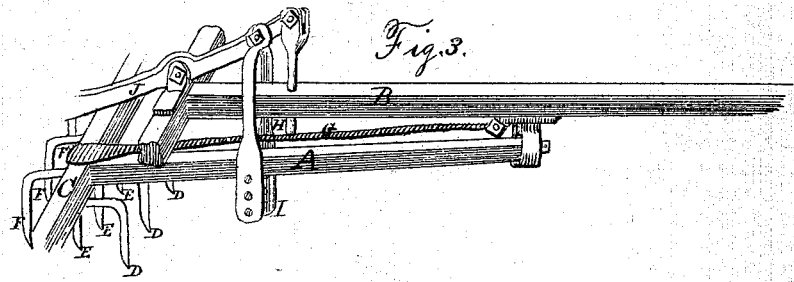

UNITED STATES PATENT OFFICE.

JAMES FRANKLIN GAZLEY, OF CANYONVILLE, OREGON.

IMPROVEMENT IN HARROWS.

Specification forming part of Letters Patent No. 139,309, dated May 27, 1873; application filed December 27, 1872.

*To all whom it may concern:*

Be it known that I, JAMES FRANKLIN GAZLEY, of Canyonville, in the county of Douglas, and State of Oregon, have invented certain Improvements in Harrows, of which the following is a specification:

The first part of my invention relates to the attachment of the harrow, by means of a false tongue, to and below the pole, to allow the harrow to work over uneven ground. The second part of my invention relates to the shape and arrangement of the teeth, being three or more rows on one beam, thereby allowing clods and stones to go through without clogging. The third part of my invention relates to a stirrup to keep the harrow in place, and also to raise the harrow, when desired. The fourth part of my invention relates to a spring and plunger, which by pushing forward the levers presses the plunger on the spring, making the harrow go deeper.

Figure 1 is a perspective view of the sulky-harrow. Figs. 2 and 3 show in detail the arrangement of the teeth on the single bar. Fig. 4 shows the false tongue hung under the pole, and the spring and plunger by which it is operated.

A is the false tongue suspended under the pole B. C is the harrow-bar attached to the end of the false tongue, and containing three rows of teeth, of which the row marked D D D is bent forward of the harrow-bar. The row E E E are perpendicular teeth. The row F F F are the teeth back of the bar. G is the spring immediately over the false tongue, operated on by the plunger H. I is the stirrup for raising the harrow. J is the lever with the handles K and L, for use in walking or riding. M is the ratchet for holding the harrow in the ground when the lever J is pushed forward.

I claim—

1. The swiveled tongue A and harrow-head C, in combination with the main tongue B.

2. The swiveled tongue A and head C, in combination with the spring G, lever J, and stud H, substantially as described and for purposes set forth.

JAMES FRANKLIN GAZLEY.

Witnesses:

JAMES WALTON,
WILLIAM SAVAGE.